United States Patent [19]

Risnes

[11] Patent Number: 5,339,599
[45] Date of Patent: Aug. 23, 1994

[54] PACKAGING SYSTEM WITH A FLITE ADJUSTER MECHANISM

[75] Inventor: Scott C. Risnes, Minnetonka, Minn.
[73] Assignee: Thiele Engineering Company, Minneapolis, Minn.
[21] Appl. No.: 972,927
[22] Filed: Nov. 6, 1992
[51] Int. Cl.[5] .................... B65B 65/02; B65B 59/02
[52] U.S. Cl. ............................. 53/252; 53/393; 493/479
[58] Field of Search ............. 493/479, 478, 475; 53/252, 393

[56] References Cited

U.S. PATENT DOCUMENTS

| | | | |
|---|---|---|---|
| 2,029,394 | 2/1936 | Sidebotham | 493/479 X |
| 3,618,479 | 11/1971 | Shields | 493/479 X |
| 5,104,365 | 4/1992 | Sone et al. | 493/479 X |

*Primary Examiner*—James F. Coan
*Attorney, Agent, or Firm*—Hugh D. Jaeger

[57] ABSTRACT

A packaging machine with a flite adjustment mechanism for readily changing the distance between a rearward and a forward set of flites where a flits head shaft is coupled by a chain to a slave shaft by a phase adjuster. The flight head shaft drives a pair of outboard flite sprockets and chains. The slave shaft drives an independently rotating hub which drives a pair of inboard chains via inboard flits sprockets, which are driven at approximately the same speed as and angularly deflected from a pair of outer sprockets. Spacing of the flites is changed by adjustment of a phase adjuster. A splined network also allows for adjustment to accommodate different flits lengths.

4 Claims, 3 Drawing Sheets

PACKAGING SYSTEM WITH A FLITE ADJUSTER MECHANISM

BACKGROUND OF THE INVENTION

1. Field of the Invention

The present invention pertains to a packaging machine, and more particularly, pertains to a mechanism for the space adjustment between forward and rearward sets of flites in a packaging machine.

2. Description of the Prior Art

Prior art flite adjustment methods were cumbersome at best, requiring time consuming manual adjustment of drive sprockets and securing means to obtain spacing between rearward and forward sets of flites on a packaging machine. The prior art has failed to address a readily adjustable distancing method for the spacing of rearward and forward flites.

The present invention overcomes the inadequacies of the prior art devices by providing a readily adjustable mechanism for rapid spacing of flites for a packaging machine.

SUMMARY OF THE INVENTION

The general purpose of the present invention is to provide differential drive mechanism having a framework mounted flite head shaft for driving of outboard flite chain sprockets in a direct fashion, and a slave shaft which is driven by the flite head shaft for indirect turning of inboard flite chain sprockets where the angular displacement of the inner and outer flits chain sprocket pairs may be varied to change the spacing between appropriately connected flites. The use of splined shafts also allows the width of the flite chains to be readily changed.

According to one embodiment of the present invention, there is provided a framework mounted flite head shaft driving a framework mounted slave shaft. A first outboard flite chain sprocket is driven directly by the flite head shaft and a second outboard flite chain sprocket is driven by a spline on the flite head shaft via an adjustable splined hub which allows the second outboard flite chain sprocket to be adjusted inwardly and outwardly and to be driven by the spline on the flite head shaft. The slave shaft is coupled by a chain, a chain sprocket and a phase adjuster to the flite head shaft. The slave shaft then drives a first inboard flite chain sprocket via an intermediate chain and intermediate sprocket. The intermediate sprocket is directly coupled to the first inboard flite chain sprocket and to a splined sleeve which is concentric over and about the flite head shaft. The splined sleeve is rotationally adjustable about the flite head shaft. A second inboard flite chain sprocket aligns at the opposing end of the splined sleeve and opposite the first inboard flite chain. Rearward and forward flites mount across the outboard and inboard flite chains. The main drive shaft is tied to the slave shaft by a chain and a sprocket mounted to the phase adjuster. The phase adjuster is clamped to the slave shaft and the slave shaft is tied back to the independently rotating hub, which rotates about the main drive shaft. Mounted to the hub is mounted the center flite chain sprocket adjusted by rotating the phase adjuster.

One significant aspect and feature of the present invention is a mechanism for rapid adjustment of flite spacing for a high speed packaging machine to accommodate multiple carton sizes.

Another significant aspect and feature of the present invention is a flite adjuster mechanism having a flite head shaft which drives a slave shaft where the slave shaft can be adjusted differentially with respect to the flite head shaft to provide for longitudinal flite spacing.

A further significant aspect and feature of the present invention is a flite adjuster mechanism having both longitudinal adjustable flite spacing and a provision for rapid adjustment of flite chain sprocket spacing laterally across the mechanism.

An additional significant aspect and feature of the present invention is the use of a phase adjuster to vary the longitudinal spacing between flites.

Having thus described one embodiment of the present invention, it is the principal object hereof to provide a flite adjuster mechanism for rapid adjustment of the spacing between forward and rearward flite bars for a packaging machine.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
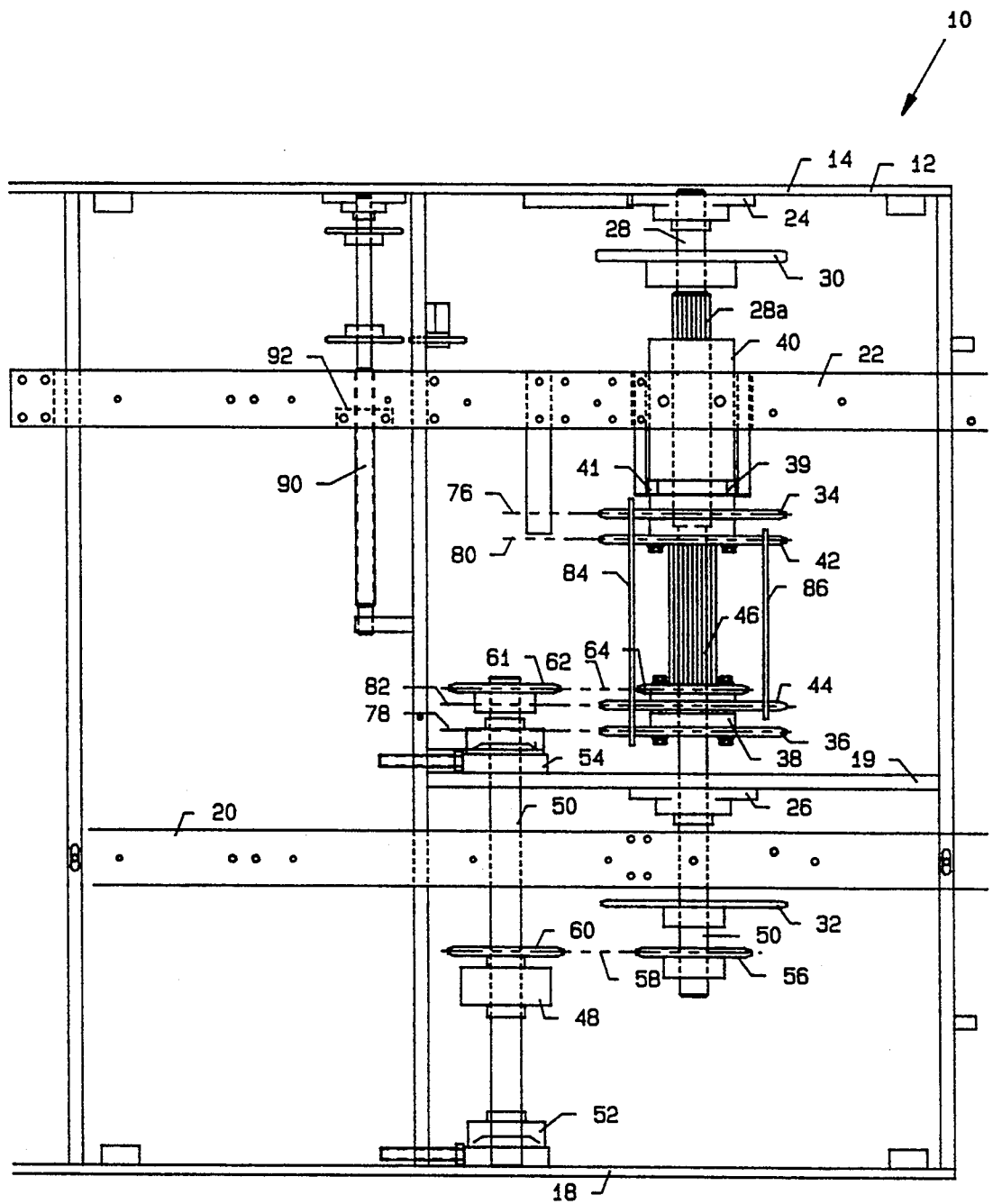
FIG. 1 illustrates a flite adjuster mechanism for a packaging machine.

FIG. 1 illustrates a flits adjuster mechanism 10 for a packaging machine aligned in a packaging machine framework 12 of which sides 14, 16 and 18, cross member 19, fixed rail 20 and adjustable rail 22 are shown. Bearings 24 and 26 secure on the packaging machine framework 14 and the cross member 19, respectively, to serve as rotary supports for a flite head shaft 28, which includes an integral splined shaft portion 28a. Drive sprockets 30 and 32 align, and secure over and about opposing ends of the flits head shaft 28 to accommodate powered drive chains as known for packaging machines and not illustrated. First and second outer flits chain sprockets 36 and 34 are driven by the flite head shaft 28. The outer flits chain sprocket 36 is appropriately mounted to the unsplined portion of the flite head shaft 28 by a fixed hub 38 and appropriate hardware. The outer flite chain sprocket 34 is driven by an inwardly and outwardly adjustable splined hub 40 having internal splines which slidingly engage the splined shaft portion 28a of the flite head shaft 28. The adjustable splined hub 40, having internal splines, adjusts inwardly and outwardly over the splined shaft portion 28 by action of the adjustable rail 22 to position the outer flite chain sprocket 34 inwardly or outwardly to adjust the outer flite chain sprocket spacing between the outer flite chain sprockets 34 and 36. Cam followers 39 and 41 position the adjustable splined hub 40 to correspond with movement of the adjustable rail 22. The spacing of first and second inner flite chain sprockets 44 and 42 is correspondingly affected by the adjustable rail 22 in that the inner and outer flite chain sprockets 34 and 42 move as a pair when the adjustable rail 22 and the adjustable splined hub 40 is moved inwardly or outwardly from the center.

The inner flite chain sprockets 42 and 44 secure to opposing ends of a splined sleeve 46 which in turn aligns concentrically over and about the unsplined portion of the flite head shaft 28. The inner flite chain sprocket 44 secures directly to one end of the splined sleeve 46, while the inner flite chain sprocket 42 slidingly engages the opposing end of the splined sleeve 46. The splined sleeve 46, and thus the inner Elite chain sprockets 42 and 44, can be positioned angularly and rotationally with respect to the axis of the flite head shaft 28 by a phase adjuster 48. This allows inner flite chain sprockets, chains and flites to be adjusted longitudinally with respect to the outer flite chain sprockets, chains and flites. The spacing is accomplished by the incorporation of a slave shaft 50 secured between bearings 52 and 54 secured to the framework side 18 and the cross member 19, respectively. A sprocket 56 secures to one end of the flite head shaft 28 and a chain 58 drive a sprocket 60 secured to the phase adjuster 48 which adjustingly secures to the slave shaft 50. Another sprocket 61 secures to the inboard end of the slave shaft 50. An intermediate sprocket 61 and an intermediate chain 62 are incorporated to drive the splined sleeve 46 via another intermediate sprocket 64 located at and secured to the inboard end of the splined sleeve 46. The inner flite chain sprocket 42 is in turn driven in sliding engagement by the splined sleeve 46.

Figure 2:
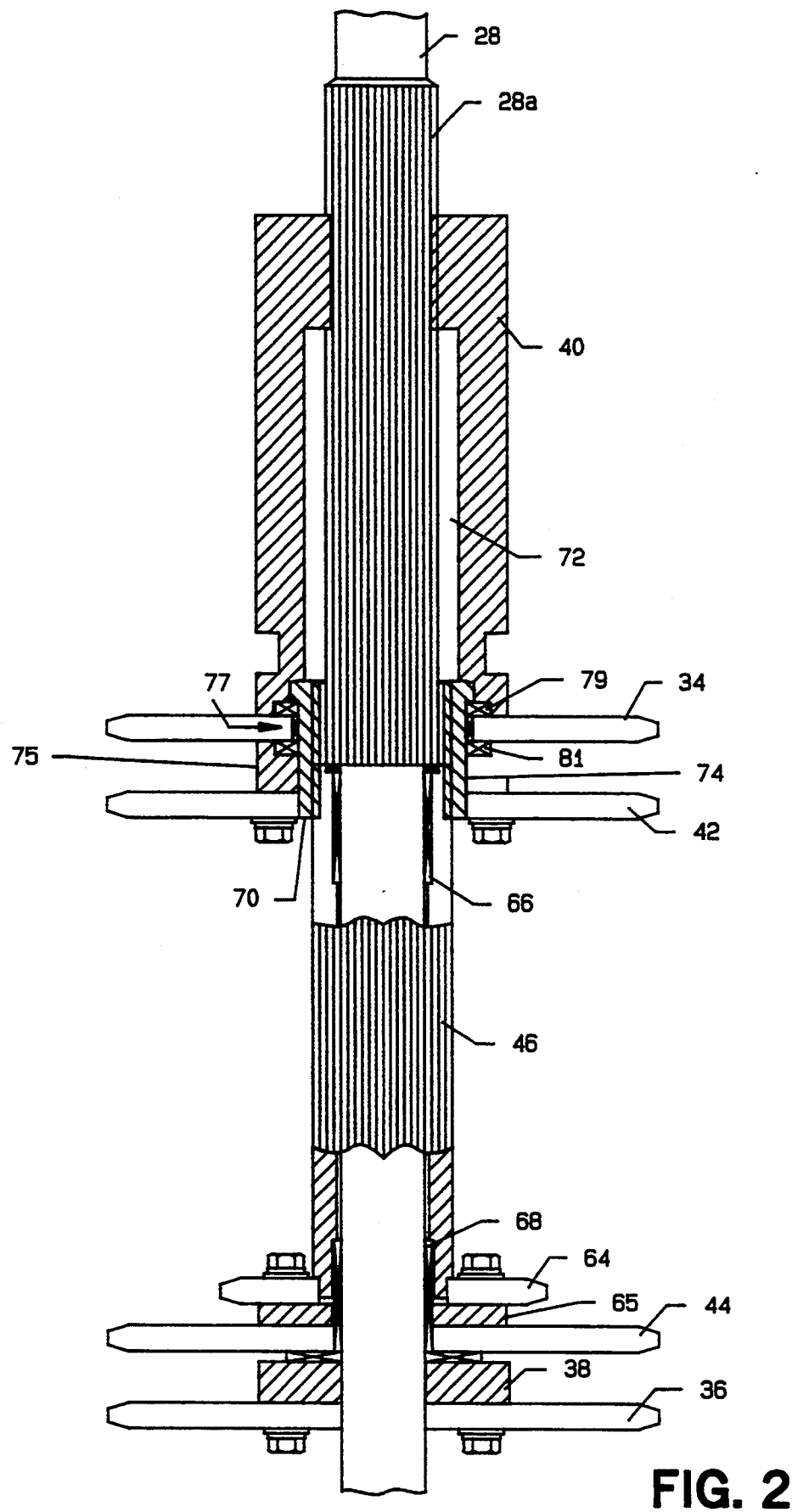
FIG. 2 illustrates a view in cross section of the splined sleeve, the adjustable splined hub and associated surrounding sprockets; and, FIG. 3 illustrates the flite adjuster mechanism of FIG. 1 having close spaced flite bars.

FIG. 2 illustrates a view in cross section of the splined sleeve 46, the adjustable splined hub 40 and the associated surrounding sprockets where all numerals correspond to those elements previously described. Illustrated in particular is the splined sleeve 46 in alignment over and about the unsplined portion of the flite head shaft 28. Bearings 66 and 68 are disposed between the inner surface of the splined sleeve 46 and the outer surface of the unsplined portion of the flite head shaft 28 for spacing and subsequent adjustment of the inner flite chain sprockets 42 and 44 angular with respect to the outer flite chain sprockets 34 and 36. A shouldered independently rotating hub 70 having a splined bore interfaces between the bore 74 of the adjustable splined hub 40 and the splines of the splined sleeve 46. Another hub 75 secures over and about the independently rotating shouldered hub 70. The inboard flite chain sprocket 42 secures with appropriate hardware to the hub 75. A bearing 77 placed at the center bore of the outboard flite chain sprocket 34 spaces the sprocket 34 from the shouldered hub 70. A thrust bearing 79 aligns between the adjustable splined hub 40 and the outboard flite chain sprocket 34. Another thrust bearing 81 aligns between the outboard flit chain sprocket 34 and the hub 75. The intermediate sprocket 64 and the inboard flite chain sprocket 44 secure to the splined sleeve 46 by the use of common appropriate hardware and a spacer 65 between the two sprockets 44 and 64. Movement of the splined shaft 46 by the intermediate sprocket 64 for flite spacings causes the inboard flite chain sprocket 44, spacer 65, the splined shaft 46, the shouldered hub 70, the hub 75 and the inboard flite chain sprocket 42 to rotationally move as a unit independently of the adjustable splined shaft 40. Inward or outward adjustment of the adjustable splined hub 40, the outer flite chain sprocket 34 and the inner flite chain sprocket 42 is accomplished by movement of the adjustable rail 22 of FIG. 1.

Figure 3:
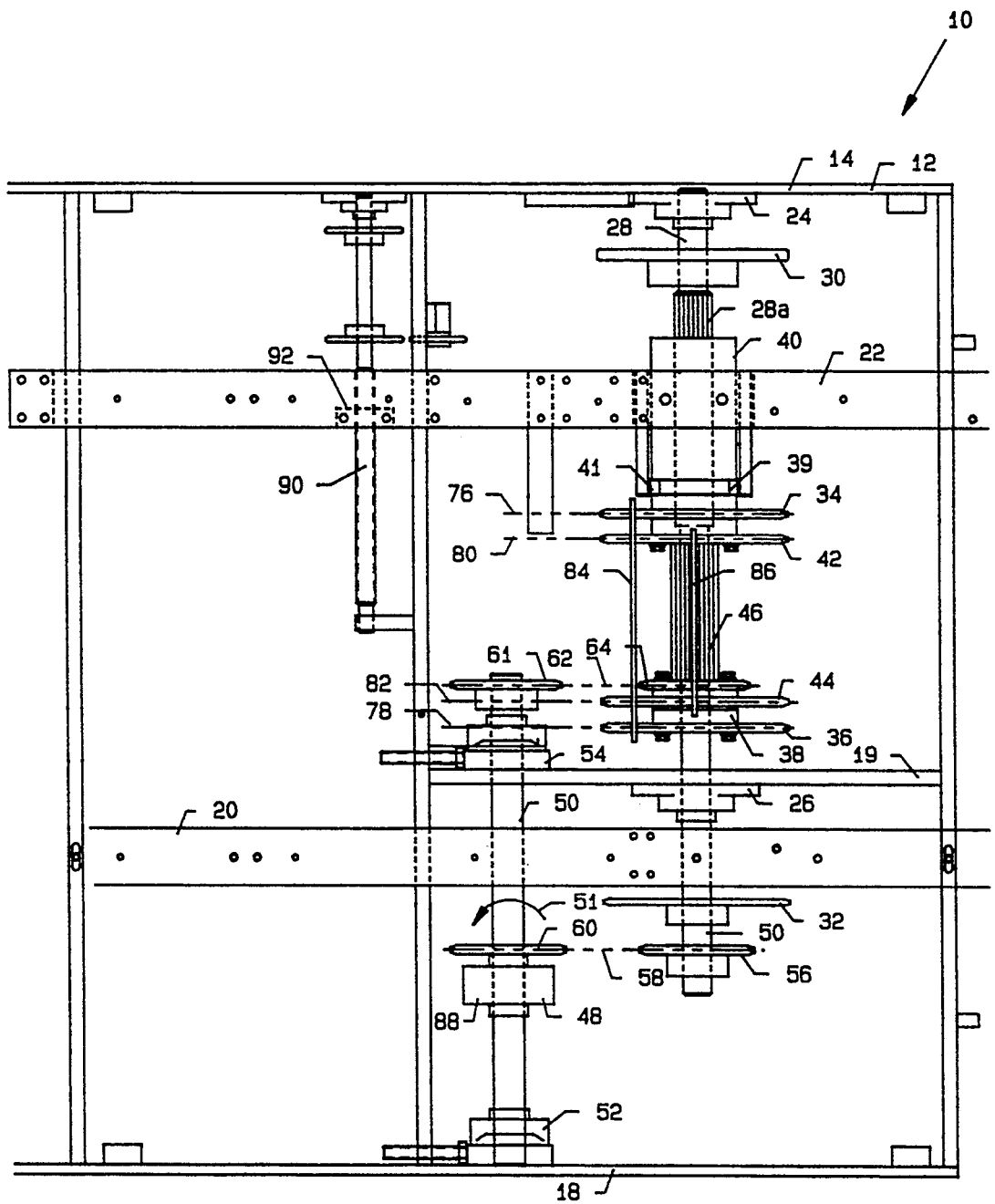

FIG. 3 illustrates a view of FIG. 1 where the flites 84 and 86 are close spaced, and where all other numerals correspond to those elements previously described.

MODE OF OPERATION

The mode of operation is best illustrated by reference to FIGS. 1, 2 and 3 where adjustment is made to the longitudinal spacing of a pair of flites. Outboard flite chains 76 and 78 are driven by outer flite chain sprockets 34 and 36, respectively, and inboard flite chains 80 and 82 are driven by the inner flite chain sprockets 42 and 44, respectively. A rearward flite 84 secures across the outboard flite chains 76 and 78, and a forward flite 86 secures across the inboard flite chains 80 and 82. The outer flite chain sprockets 34 and 36, the outboard flite chains 76 and 78, and the rearward flite 84 are primarily driven by action of the flite head shaft 28. The inner flite chain sprockets 42 and 44, the inboard flite chains 80 and 82, and the forward flite 86 are primarily driven by the action of the slave shaft 50 in relationship with the phase adjuster 48.

FIG. 1 illustrates a wide spacing between the rearward flite 84 and the forward flite 86 such as used for cartons or boxes having a large front to back dimension. Adjustment to a lesser flite spacing is accomplished by first stopping the machine. During machine stoppage, the rearward flite 84 remains in a stationary position, as illustrated in both FIGS. 1 and 3, because the flite head shaft 28 and a great number of attached sprockets and chains are held immobile. The slave shaft 50, however, can be temporarily decoupled from the now stationary flite head shaft 28 to effect the angular relationship between the inner flite chain sprocket pairs 42 and 44 and the outer flite chain sprocket pairs 34 and 36. Locking screws in the phase adjuster 48 are loosened to loosely decouple the sprocket 60 from the slave shaft 50. The phase adjuster adjustment ring 88, which is still attached to the slave shaft 50, is rotated such as in a counter clockwise direction, as shown by arrow 51, to cause corresponding movement of the slave shaft 50, sprocket 61, intermediate chain 62, intermediate sprocket 64, splined sleeve 46, inner flite chain sprocket 44, inner flite chain sprocket 42, hub 70, and forward flite 86 as illustrated in FIG. 3. After proper angular deflection of the inner and outer flite chain sprockets 42 and 44 and 34 and 36, the locking screws on the phase adjuster 48 are tightened to again fix the sprocket 60 to the phase adjuster 48. The spacing between the flites may be empirically determined by adjustment of the flites about the carton.

Distancing across the flite chains is accomplished by movement of the adjustable rail 22, preferably by movement of a threaded shaft 90 connected to the adjustable rail 22 by a flange 92. The splined portion 28a of the flite head shaft 28, the splined portion of the shouldered hub 70 and the splined sleeve 46 allow for lateral motion of the inner and outer flite chain sprockets 34 and 42, and thus the outboard and inboard flite chains 76 and 80.

Various modifications can be made to the present invention without departing from the apparent scope hereof.

I claim:

1. A packaging machine with a flite adjuster comprising:
   a. a main drive shaft;
   b. a slave shaft and chain means connecting said slave shaft to said drive shaft;

c. a phase adjuster means connected to said slave shaft;

d. said slave shaft connected to a rotating hub, rotatably mounted on said main drive shaft; and, e. a center flite chain sprocket connected to said rotating hub, whereby said center flite chain sprocket is angularly adjusted relative to the main drive shaft by said phase adjuster.

2. A packaging machine having flites for carrying product through the machine comprising:

a. a main drive shaft;

b. first and second sprockets mounted on the main drive shaft;

c. first and second chains driven by the first and second sprockets;

d. a first flite mounted transversely on the first and second chains;

e. a slave shaft parallel to and driven by the main drive shaft;

f. a hub rotatably mounted on the main drive shaft;

g. third and fourth sprockets mounted on the hub;

h. third and fourth chains driven by the third and fourth sprockets;

i. a second flite mounted transversely on the third and fourth chains;

j. drive means connecting the hub to the slave shaft for rotating the hub as the slave shaft rotates; and, k. a phase adjuster mounted on the slave shaft for rotating the slave shaft and altering the rotational phase of the third and fourth sprockets relative to the rotation of the first and second sprockets, thereby altering the distance between the first and second flites.

3. The packaging machine of claim 2 wherein the drive means further comprises:

l. a fifth sprocket mounted on the slave shaft;

m. a sixth sprocket mounted on the hub; and, n. a fifth chain mounted on the fifth and sixth sprockets for driving the hub and the slave shaft rotates.

4. The packaging machine of 1 or 2 wherein:

a. the hub includes a first portion having outer splines and a second section having inner splines, the second section being slidably mounted over the second section with the inner splines engaging the outer splines; and, b. the third sprocket being mounted on the first portion of the hub and the fourth sprocket being mounted on the second portion of the hub so that distance between the third and fourth sprockets is adjusted as the first and second portions are slidably moved relative to each other.

* * * * *